Sept. 4, 1973  P. A. DILLARD  3,756,858
FOLDING THIN-FILM DEPLOYABLE PANEL STRUCTURE
Filed Sept. 14, 1970  3 Sheets-Sheet 1
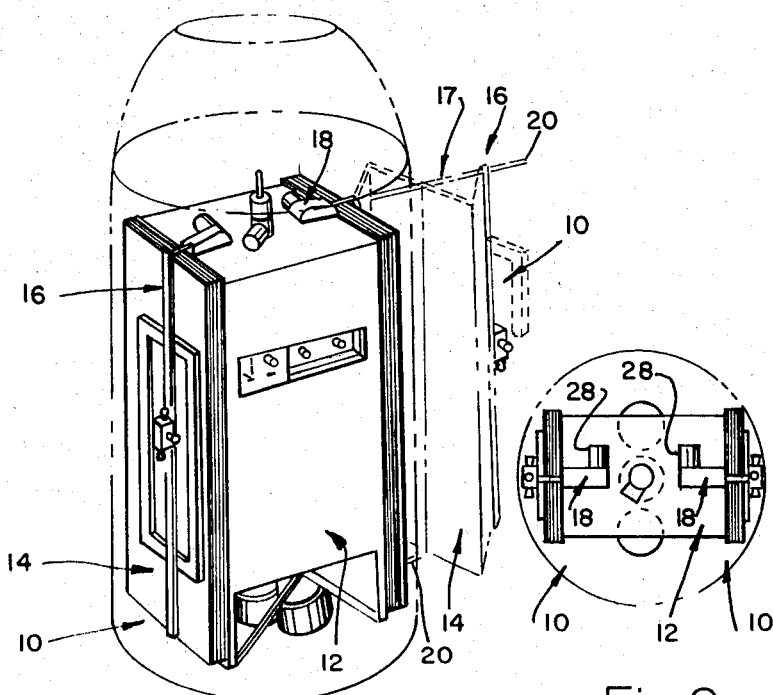
Fig.1
Fig.2
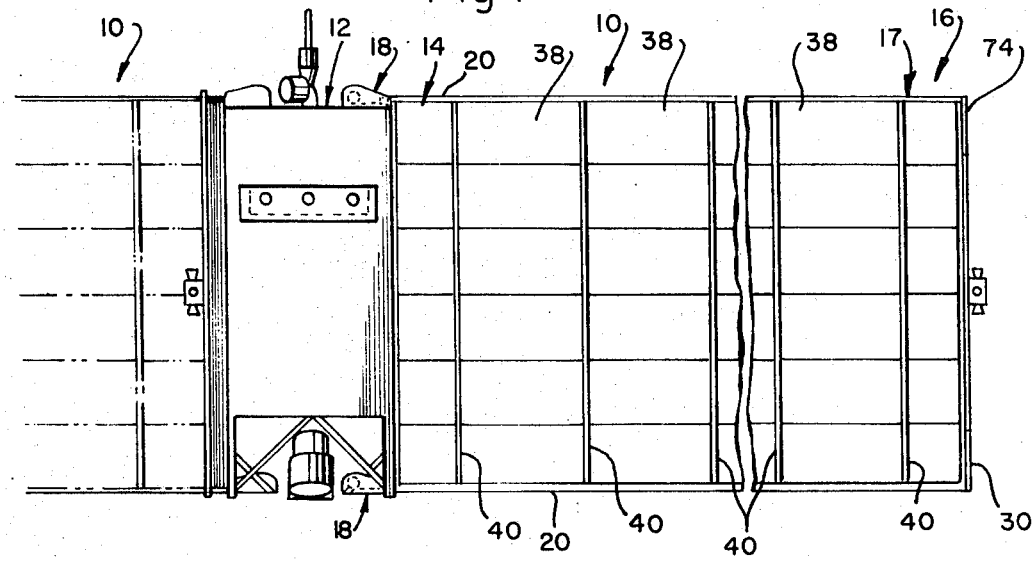
Fig.3
Paul A. Dillard
INVENTOR.
BY
Donald R. Nyhagen
ATTORNEY

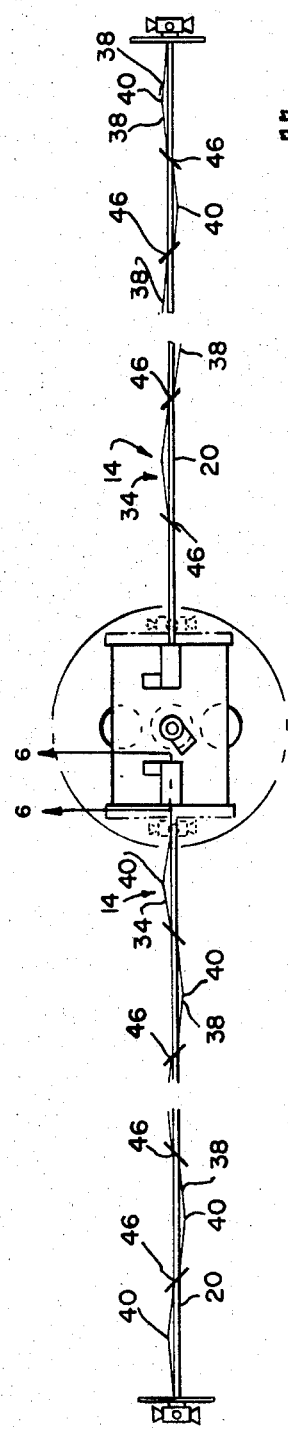
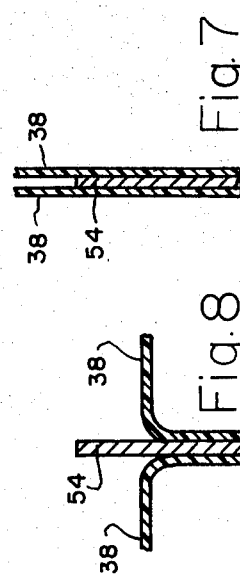
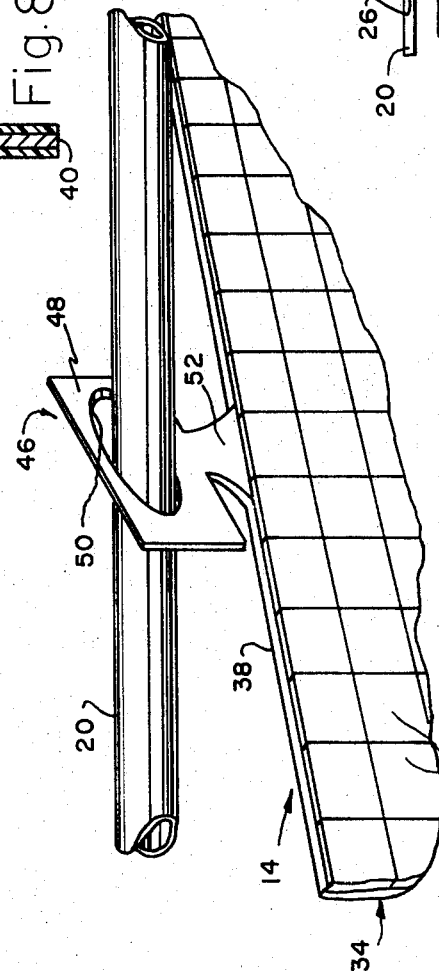
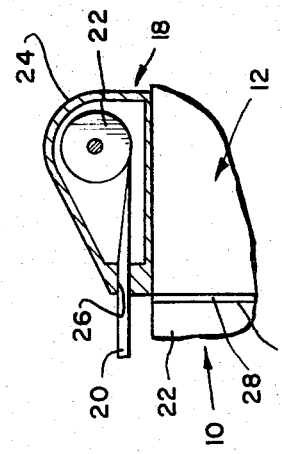
Paul A. Dillard
INVENTOR.

Paul A. Dillard
INVENTOR.

United States Patent Office 3,756,858
Patented Sept. 4, 1973

3,756,858
FOLDING THIN-FILM DEPLOYABLE
PANEL STRUCTURE
Paul A. Dillard, Littleton, Colo., assignor to
TRW Inc., Redondo Beach, Calif.
Filed Sept. 14, 1970, Ser. No. 72,015
Int. Cl. H01l *15/02*
U.S. Cl. 136—89          5 Claims

ABSTRACT OF THE DISCLOSURE

A deployable panel structure for a spacecraft solar ray and other uses. The panel structure has a support mounting a deployable boom attached to a folding panel including a number of panel sections hinged edge-to-edge along parallel hinge lines normal to the extension axis of the boom. The folding panel is extendable with the deployment boom from a stowed configuration wherein the panel sections are folded accordian-fashion into confronting face-to-face relation flat against one side of the support to a deployed configuration wherein the panel sections are disposed edge-to-edge substantially in a common plane containing the boom. The panel sections comprise thin-film substrates attached to the deployment boom by tab-like extensions having outer apertured portions which slidably receive the boom and inner neck portions which twist to accommodate folding and unfolding rotation of the panel sections relative to the boom during retraction and extension movement of the panel between its stowed and deployed configurations. These tabs provide the panel with minimum overall folded thickness in its stowed configuration and produce minimal distortion of the panel section substrates in deployed configuration. The folding panel may be reinforced along its hinge lines to prevent buckling and may be provided along its longitudinal edges with electrical bus conductors which serve the dual function of electrical and mechanical hinge connections between adjacent panel sections.

BACKGROUND OF THE INVENTION (1) Field of the invention

This invention relates generally to deployable structures and more particularly to a deployable panel structure for spacecraft solar arrays and other uses having a folding panel constructed of a thin-film substrate attached to a deployment boom in a unique manner which permits the panel to assume an extremely compact stowed configuration and a planar deployed configuration.

(2) Prior art

As will appear from the ensuing description, the deployable panel structure of the invention may be utilized in an antenna, solar array, and other applications. The panel structure will be disclosed in connection with its use in a deployable solar array for a spacecraft. Deployable solar arrays with folding solar panels are known in the art. A typical solar array of this type has a support, such as the body of the spacecraft, mounting a deployment boom which may be extended outwardly from one side of the support. Attached to the deployment boom is a folding solar panel composed of a number of panel sections hinged edge-to-edge along hinge lines extending normal to extension axis of the boom. The two end panel sections are attached, respectively, to the support and to a cross-member at the outer end of the boom. In the stowed configuration of the solar array, the deployment boom is retracted to locate the cross-member adjacent the support, and the solar panel sections are folded accordian-fashion into confronting face-to-face relation flat against the side of the support. During deployment, the boom is extended outwardly from the support to unfold the solar panel to a deployed configuration wherein the panel sections are disposed edge-to-edge substantially in a common plane containing the boom.

In the course of stowage and deployment of the solar array, the solar panel sections rotate relative to the deployment boom about axes parallel to the hinge axes of the sections. As a consequence, the panel sections must be attached to the boom by means which permit such rotation. Other requirements of such a folding solar array are a low ratio of weight to solar panel surface area, simplicity of construction, low-cost, and minimum overall thickness of the solar panel in its folded configuration.

SUMMARY OF THE INVENTION

The present invention provides an improved deployable panel structure for a solar array and other uses which uniquely satisfies the stated requirements. The panel structure has a deployment boom mounted on a support, such as the body of a spacecraft, and a folding panel attached to the deployment boom. The panel is divided into a number of folding panel sections having a substrate of thin-film sheet material, such as Mylar or Kapton, and hinged edge-to-edge along hinge lines extending normal to the extension of the deployment boom. The deployment boom is attached to the folding panel for extension of the panel with the boom from a stowed configuration, wherein the panel sections are folded accordian-fashion into confronting face-to-face relation flat against the adjacent side of the support, to a deployed configuration, wherein the panel sections are disposed edge-to-edge substantially in a common plane containing the deployment boom.

A primary feature of the invention involves the attachment of the folding panel to the deployment boom. According to this feature, the folding sections of the panel are provided with projecting boom attachment tabs which are integral extensions of the panel section substrates. Each tab has an outer apertured portion containing an opening which slidably receives the deployment boom and an inner twistable neck portion. These attachment tabs are located on the center lines of their respective panel sections and are designed to twist about these center lines in such a way as to permit folding and unfolding rotation of the panel sections relative to the deployment boom during stowage and deployment of the panel structure.

The present boom attachment tabs, having the same thickness as the panel section substrates, do not contribute to or increase the overall thickness of the stack of folded panel sections in the stowed configuration of the panel structure.

According to a feature of the invention, buckling of the thin panel substrates during deployment of the panel structure is avoided by stiffening elements attached to the panel along its hinge lines. According to another feature, resilient electrical bus conductors joined to the longitudinal edges of the panel provide both electrical and mechanical hinge connections between the adjacent panel sections.

BRIEF DESCRIPTION OF THE DRAWINGS

In the drawings:

FIG. 1 is a perspective view of a spacecraft mounting a pair of the solar arrays embodying the deployable panel structure of the invention;

FIG. 2 is a top view of the spacecraft with the solar arrays retracted;

FIG. 3 is a side elevation of the spacecraft with the solar arrays deployed;

FIG. 4 is a top view of the spacecraft with the solar arrays deployed;

FIG. 5 is an enlarged detail in perspective of a present tab connection between a solar array panel and a deployment boom;

FIG. 6 is an enlarged section taken on line 6—6 in FIG. 4;

FIG. 7 is an enlarged section through the hinge line of a modified solar panel equipped with a reinforcing strip for preventing buckling of the folding panel sections during deployment;

FIG. 8 is a section similar to FIG. 7 showing the panel sections unfolded; and

DESCRIPTION OF THE PREFERRED EMBODIMENTS

Figure 9:
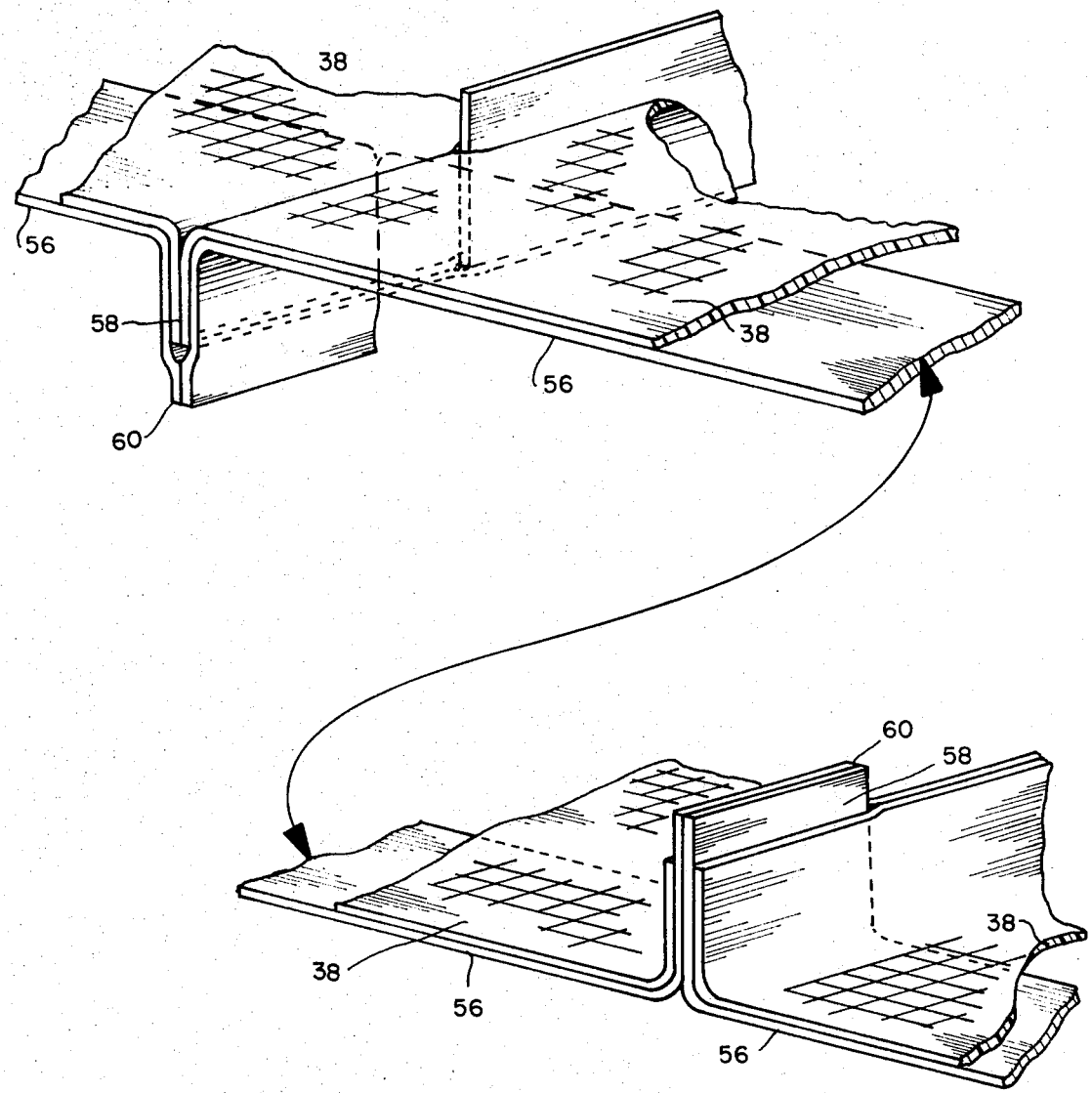
FIG. 9 illustrates a further modified solar panel having electrical bus conductors which provide electrical connections and hinge connections between the adjacent folding panel sections.

The drawings illustrate a pair of folding deployable solar arrays 10 according to the invention mounted on a support 12. In this case, the support is the body of the spacecraft. Each solar array 10 has a folding solar panel 14 and a deployment mechanism 16 for the panel. This deployment mechanism includes a deployment boom 17. As will appear from the ensuing description, the invention may utilize any suitable type of deployment boom.

Deployment boom 17 comprises a pair of so-called linear extenders 18 each having a beam 20 comprising a strip of spring metal, typical stainless steel, which is stressed to curl laterally into a tubular configuration having its central axis parallel to the longitudinal axis of the strip. The inner end of the beam 20 is secured to a reel 22 rotatably mounted within a housing 24 on the spacecraft 12. The free end of the beam extends from this housing through a cylindrical exit guide 26. The reel 22 is driven by a reversible electric motor 28. Extending between and joining the outer ends or tips of the beams 20 is a cross-member 30.

The reels 22 of the linear extenders 18 are rotatable by their respective motors 28 to extend and retract the beams 20 relative to the spacecraft 12. The motors are synchronized to effect such extension and retraction of the beams in unison. In their extended positions, the beams 20 extend outwardly in parallel relation beyond one side of the spacecraft 12. In their retracted positions, the beams 20 are wound in flat condition on their reels 22 to locate the cross-member 30 in close proximity to the adjacent side of the spacecraft 12.

The solar panel 14 of each solar array is divided into panel sections 38 hinged edge-to-edge along hinge lines 40 normal to the longitudinal edges of the panel and to the booms 20. Panel sections 38 comprise substrates of thin-film sheet material, such as Mylar or Kapton, to which are secured solar cells 36. The substrates of adjacent panel sections are joined by tape or other hinge means to be described presently.

The inner end of the solar panel 34 is attached to the adjacent side of the spacecraft 12 along an inner hinge line parallel to the intervening hinge lines 40. The outer end of the panel is attached to the boom cross-member 30 along an outer hinge line parallel to the intervening hinge lines.

The invention is primarily concerned with the attachment of the longitudinal margins of the solar panel 14 to the depolyment boom 17. According to the invention, this attachment is accomplished by projecting tabs 46 along the end edges of the solar panel sections 38, that is the edges of the panel sections which coincide with the longitudinal margins of the solar panel 14 and parallel the extender beams 20. These boom attachment tabs are integral extensions of the panel section substrates. Each tab has an outer apertured portion 48 containing an opening 50 and a neck portion 52 joining the outer portion to the respective panel section 38.

The outer opening 50 in each tab 46 slidably receives the adjacent extender beam 20. The inner neck portion 52 of each tab is relatively narrow, such that it may twist freely to permit folding rotation of its panel section 38 relative to the adjacent beam 20 during storage and deployment of the solar array in the manner hereinafter described. The illustrated tabs 46 have a generally T-shape. In this regard, it will be observed that the outer portion 48 of each tab is elongated in the lengthwise direction of the solar panel 14 and the extender beams 20. The opening 50 in each tab is similarly elongated in lengthwise direction of the solar panel and beams and thus has a generally oval shape. The inner neck portion 52 of each tab is reduced in width and extends from the center of its respective outer tab portion, along the center line of the adjacent solar panel section 38.

Each solar array 10 is retractable and extendable relative to the spacecraft 12 between stowed and deployed configurations. In the stowed configuration of each solar array, its deployment boom 17 is retracted to a position wherein the boom cross-member 30 is located in close proximity to the adjacent side 30 of the spacecraft. In this configuration, the solar panel 14 of the array is folded accordian-fashion to locate the solar panel sections 38 in confronting face-to-face relation flat against the adjacent side of the spacecraft 12. The cross-member 30 presses inwardly against the outermost panel section to retain the panel sections in their folded configuration. Deployment of each solar array 10 is accomplished by extending its deployment boom 17 outwardly from the spacecraft. In the fully deployed configuration of the solar array, the solar panel sections 38 are disposed in edge-to-edge relation substantially in a common plane containing the extended deployment boom.

It will be observed that during stowage and deployment of each solar array 10, the extender beams 20 of the deployment boom 17 undergo relative longitudinal sliding movement back and forth through the openings 50 in the tabs 46 on the solar panel sections 38. These panel sections, in turn, rotate about their center lines 54 relative to the beams 20. Such rotation is permitted by the tabs 46. Thus, the elongate or oval shape of the tab openings 50 permit some bodily rotation of the tabs relative to the beams 20 and hence some rotation of the panel sections 38 relative to the beams. The torsional resiliency of the inner neck portions 52 of the tabs 46 permit additional rotation of the panel sections relative to the beams. An important feature of the invention resides in the fact that the tabs do not increase the overall thickness of the folded solar array. Accordingly, the overall folded thickness of the array is determined by the overall thickness of the folded array panel sections 38. Also, during extension and retraction of the array, the reduced neck portions 52 of the tabs 46 twist freely to permit folding and unfolding of the panel sections without distortion of the panel sections substrates. The elongated hole, narrow neck, and material flexibility of the tabs 46 prevent hang-up during deployment. When the array is deployed, the tabs prevent the panels from separating from the booms.

Loads applied to array when deployed and the loading applied to the solar panel 14 during extension of the solar array 10 to its deployed configuration may tend to cause buckling of the panel section substrates. Such buckling may be prevented by securing thin reinforcing strips 54 to the panel along its hinge lines, as shown in FIGS. 7 and 8. These strips may comprise beryllium copper or other suitable material to provide reinforcing spines along the hinge lines which restrain the panel against buckling during and after deployment.

According to another feature of the invention, spring strips 56 (FIG. 9) of beryllium copper or other spring metal may be secured to the longitudinal marginal edges of the panel sections 38. The ends of these strips extend beyond the lateral edges of the sections and are turned at right angles to provide tabs 58 which are joined to form electrical and mechanical hinge connections 60 between the adjacent sections. When the modified solar array of FIG. 9 is contracted to its stowed configuration, these hinge connections are stressed to store elastic strain energy which aids unfolding of the panel during deployment. After deployment, the electrically connecting strips 56 provide electrical bus conductors for connecting the solar cells 36 to the spacecraft 12.

What is claimed as new in support of Letters Patent is:

1. A deployable panel structure comprising:
   a support;
   a deployment mechanism mounted on said support including a deployment boom movable longitudinally between a retracted position wherein the outer end of said boom is situated adjacent one side of said support and an extended position wherein said boom projects outwardly from said side;
   a folding panel at one side of said boom including a number of rectangular panel sections hinged edge-to-edge along hinge lines normal to the boom and each comprising a thin-film substrate having a longitudinal edge adjacent the boom;
   means joining the inner end of said panel to said support along an inner hinge line parallel to said first mentioned hinge lines;
   means joining the outer end of said panel to the outer end of said boom along an outer hinge line parallel to said first mentioned hinge lines; and
   the substrate of each panel section having an integral normally coplanar T-shaped tab comprising a single thickness of substrate material projecting from said longitudinal edge of the substrate between the adjacent panel hinge lines, each tab having an enlarged outer apertured portion containing an opening elongated lengthwise of and slidably receiving said boom and an inner reduced neck portion joining said outer portion to the respective panel section substrate.

2. A deployable panel structure according to claim 1 including:
   thin reinforcing elements secured to said panel along said hinge lines.

3. A deployable panel structure according to claim 2 wherein:
   said reinforcing elements are strips positioned between and secured to the lateral edges of the adjacent panel section substrates.

4. A deployable panel structure according to claim 3 including:
   spring strips secured to the panel section substrates along their longitudinal marginal edges and extending between said hinge lines, the ends of each strip being turned 90° in opposite directions, and the adjacent strip ends being turned in the same direction and joined to form resilient hinge connections between the adjacent panel sections.

5. A deployable panel structure according to claim 1 including:
   spring strips secured to the panel section substrates along their longitudinal marginal edges and extending between said hinge lines, the ends of each strip being turned 90° in opposite directions, and the adjacent strip ends being turned in the same direction and joined to form resilient hinge connections between the adjacent panel sections.

References Cited

UNITED STATES PATENTS

| 3,532,299 | 10/1970 | Williamson et al. | 136—89 X |
| 2,840,155 | 6/1958 | Stein | 16—87.2 X |

FOREIGN PATENTS

| 1,081,828 | 1/1956 | France | 160—84 R |

ALLEN B. CURTIS, Primary Examiner

U.S. Cl. X.R.

16—87.2; 160—84 R